United States Patent [19]

Cappa et al.

[11] Patent Number: 4,832,785
[45] Date of Patent: May 23, 1989

[54] INDUSTRIAL PLANT AND METHOD FOR THE MANUFACTURING OF A GLASS AND SEALING STRIP ASSEMBLY, PARTICULARLY FOR MOTOR VEHICLE GLAZING

[75] Inventors: Sergio Cappa; Nicola Caldoro, both of Turin; Ciro Paudice, Vasto, all of Italy

[73] Assignee: Societa Italiana Vetro SIV S.p.A., San Salvo, CH, Italy

[21] Appl. No.: 32,584

[22] Filed: Apr. 1, 1987

[30] Foreign Application Priority Data

Apr. 3, 1986 [IT] Italy .................. 47852 A/86

[51] Int. Cl.$^4$ .................. B32B 31/00; B05C 1/00
[52] U.S. Cl. .................. 156/495; 156/522; 156/526; 156/584; 156/248; 118/213
[58] Field of Search ............... 156/248, 344, 584, 521, 156/570, 475, 496, 510, 583.5, 519, 354, 486, 488, 495, 475, 526, 522, 530, 267, 536; 427/272, 282; 29/423, 424, 426.2; 118/213

[56] References Cited

U.S. PATENT DOCUMENTS

| | | | |
|---|---|---|---|
| 2,603,899 | 7/1952 | Leander | 156/248 |
| 2,659,673 | 11/1953 | Rogers et al. | 156/257 |
| 2,999,781 | 7/1961 | Davis | 156/344 |
| 3,574,040 | 4/1971 | Chitwood et al. | 156/468 |
| 4,246,058 | 1/1981 | Reed | 156/584 |
| 4,253,910 | 3/1981 | Mason et al. | 427/272 |
| 4,274,903 | 6/1981 | Mock | 156/522 |
| 4,476,976 | 10/1984 | Smith | 427/272 |
| 4,505,774 | 3/1985 | Ariga et al. | 156/566 |
| 4,508,589 | 4/1985 | Tarui et al. | 156/584 |
| 4,519,962 | 5/1985 | Schlienkamp | 156/107 |
| 4,559,001 | 12/1985 | Wiedenhöfer et al. | 156/107 |
| 4,561,625 | 12/1985 | Weaver | 249/85 |
| 4,604,153 | 8/1986 | Melbye | 156/248 |

FOREIGN PATENT DOCUMENTS

| | | | |
|---|---|---|---|
| 747882 | 12/1966 | Canada | 156/584 |
| 682420 | 9/1939 | Fed. Rep. of Germany | 156/584 |
| 45257 | 4/1977 | Japan | 156/584 |

*Primary Examiner*—Michael W. Ball
*Assistant Examiner*—Louis Falasco
*Attorney, Agent, or Firm*—Browdy and Neimark

[57] ABSTRACT

In an on-line manufacturing of sheets of glass provided at their rim with a sealing strip of a polymeric material, a machine is provided, ahead of the sealing strip assembly, to a thin protective film to cover one face of the glass.

3 Claims, 2 Drawing Sheets

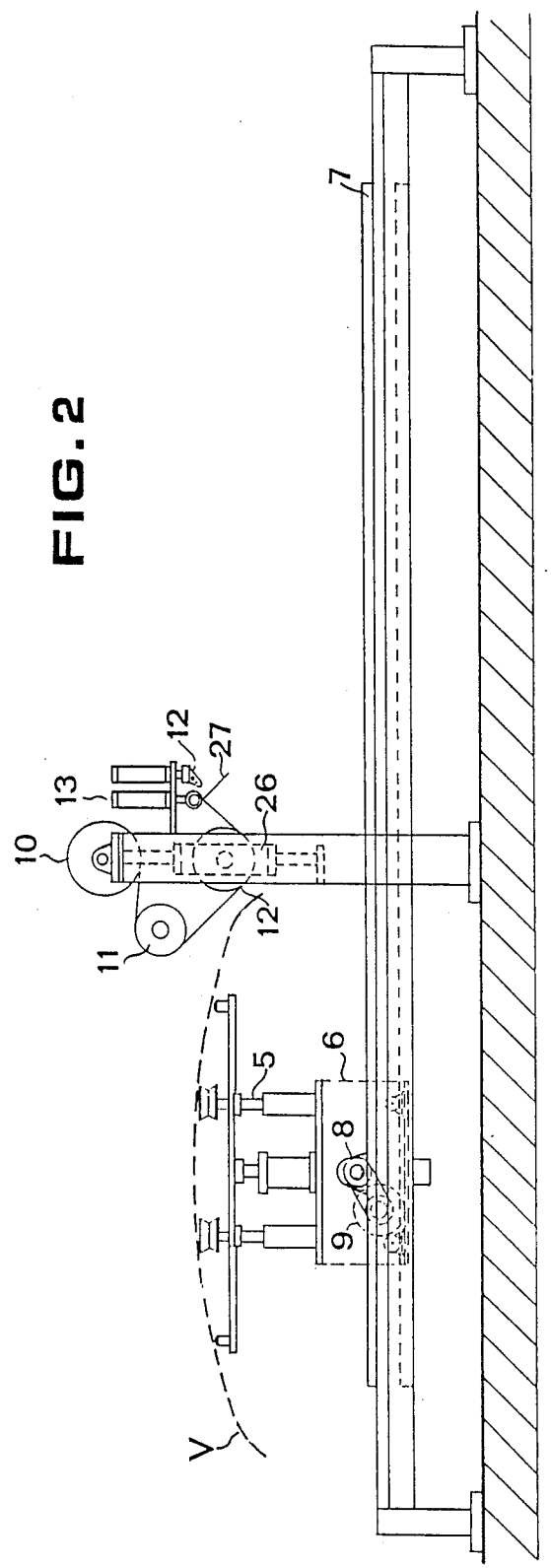

INDUSTRIAL PLANT AND METHOD FOR THE MANUFACTURING OF A GLASS AND SEALING STRIP ASSEMBLY, PARTICULARLY FOR MOTOR VEHICLE GLAZING

BACKGROUND OF THE INVENTION

1. Field of the Invention

The present invention relates to industrial manufacturing of an assembly formed by a sheet of glass and a sealing strip of a polymeric material surrounding the rim thereof, particularly a plant for the preparation of the rim of sheets of glass so as to make them suitable to be treated in a successive operation of assembling the polymeric strip.

2. Description of the Prior Art

From the prior art, assemblies formed by a sheet of glass and a polymeric sealing strip surrounding the rim thereof are well known. Hereinafter they will be indicated by the term "capsulated products". The capsulated products which are particularly used in the field of automobile glazing, have the advantage of being suitable to be mounted at very low cost on the motor vehicle bodies.

In U.S. Pat. No. 4,561,625 a process is described for automatically assembling a sealing strip on the rim of a sheet of glass, consisting in polymerising directly on the glass rim the polymeric material forming the sealing strip, as injected onto said rim at a controlled pressure and temperature.

In U.S. Pat. No. 4,561,625 filed Dec. 23, 1983, an apparatus, particularly a mold, is described for the formation, by means of injection and polymerisation of polymeric material, of a sealing strip which capsulates the peripheral edge portion of a sheet of glass, for example a motor vehicle windscreen, in such a manner that the glass and sealing strip assembly so obtained can be directly mounted onto the body of the vehicle.

The manufacturing of the glass and sealing strip assemblies as previously described, is effected in a work cycle formed by three main operations: a treating operation for preparing the rim of the sheet of glass, a capsulating operation and a finishing operation of the product.

Each of the three main operations in turn consist of a certain number of elementary steps.

The treating operation provides a preparation of the upper face of the glass rim in order that it can be intimately bound to the polymeric sealing strip which is applied in the capsulating operation. By the term "upper face" of the sheet, the face which remains on the exterior of the car when the glass is mounted is intended.

For this purpose the rim of ths sheet has first to be accurately cleaned and it then has to be coated with a chemical composition having the function of promoting the glass-sealing strip bond and which is currently denominated adhesion promoter.

The purpose of the finishing operation is to provide the capsulated product with all the aesthetic characteristics for commercial requirements.

Of the aesthetic characteristics which are provided in the finishing operation, one of the most important is the resistence of the sealing strip to U.V. radiation. In fact it is known that the polyurethane strip has the tendency to be opacified on its surface, thus loosing its brightness after prolonged exposure to U.V. rays. To overcome said drawback, the prior art teaches that it is sufficient to cover the polyurethane with a paint which is opaque to the U.V. radiation.

Rather than spraying the capsulated product in the finishing operation, painting can also be carried out along with the capsulating operation by coating a suitable paint onto the surface of the mould.

In both cases an undesirable blotting of the surface not to be involved in the capsulation can occur. In fact spraying could lead to an inaccurate application of the paint, and coating the mould could lead to a localised seepage of the paint towards the inner surface of the glass.

As in the application of the adhesion promoter and paint a protection of the sheet surface not to be involved in the capsulation is necessary, the prior art afforded this protection by masks of a sufficiently light and resistant material applied by hand during the operations and so shaped as to conform to the surface to be protected.

This produces the following disadvantages: a need to prepare a mask for each model of glass to be capsulated; an excessive man-power during the course of working with frequent handling of the glass which could cause damage, such as scratches and chipping.

SUMMARY OF THE INVENTION

An object of the present invention is to eliminate the above-mentioned disadvantages.

The invention solves the problems of protection of the glass surface and excessive working man-power, by using a thin layer of a self-adhesive low density polyethylene film which is applied by automatic control on the whole surface of the sheet of glass to be capsulated. This solution not only provides the protection of the surface of the glass, but also makes it possible to make the whole work line automatic.

EFFECT OF THE INVENTION

The advantages provided by the present invention substantially consist in the fact that scratches on the glass are avoided; damage due to an overflow of the adhesion promoter beyond the rim to be covered is avoided; a possible seepage of injected polymer on the glass is rendered not critical; the preparation of protection masks for each model of glass to be capsulated is avoided; a complete cross-linking of the adhesion promoter is ensured and consequently the adhesion between glass and sealing strip is improved.

An object of the present invention is an automatic plant for the manufacture of a glass and sealing strip assembly, including a plurality of on-line apparatus to carry out a treating operation on the rim of a sheet of glass so as to prepare it for a successive capsulating operation effected by a capsulating apparatus, comprising the improvement of an automatic machine positioned ahead of said on-line apparatus for laying on the whole surface of one face of the sheet of glass a protective layer of a self-adhesive film of plastic material, a trimming machine for cutting and removing said layer from the rim area to be treated in said treating operation, and a peeling machine positioned after said capsulating apparatus for peeling off said layer from said face, whereby said face remains covered and protected during the whole cycle of manufacture of the glass and sealing strip assembly.

A further object of the present invention is a method for the manufacture of a glass and sealing strip assembly comprising an automatic operation for covering the surface of the glass by means of a layer of self-adhesive film of plastic material which is easily peeled off at the end of the cycle.

BRIEF DESCRIPTION OF THE DRAWINGS

The invention is described in further detail hereinafter, with reference to the enclosed drawings which illustrate an example of embodiment.

In the drawings:

FIG. 2 is a side view of a machine for applying a polyethylene film onto the surface of the sheet of glass to be capsulated.

DESCRIPTION OF THE PREFERRED EMBODIMENT

Figure 1:
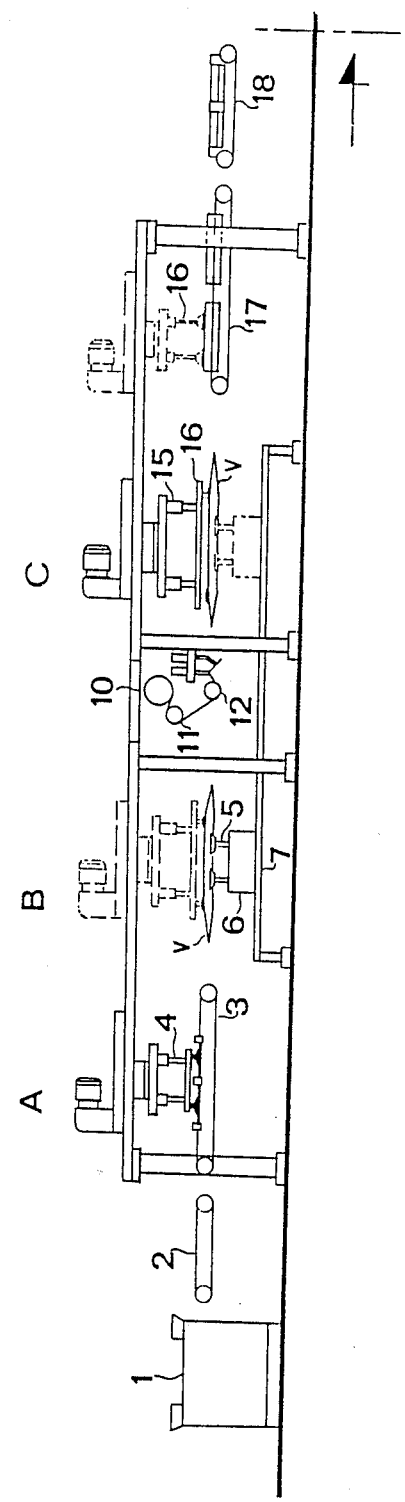
FIG. 1 is a side view of the mechanically controlled plant according to the invention.
Figure 1:
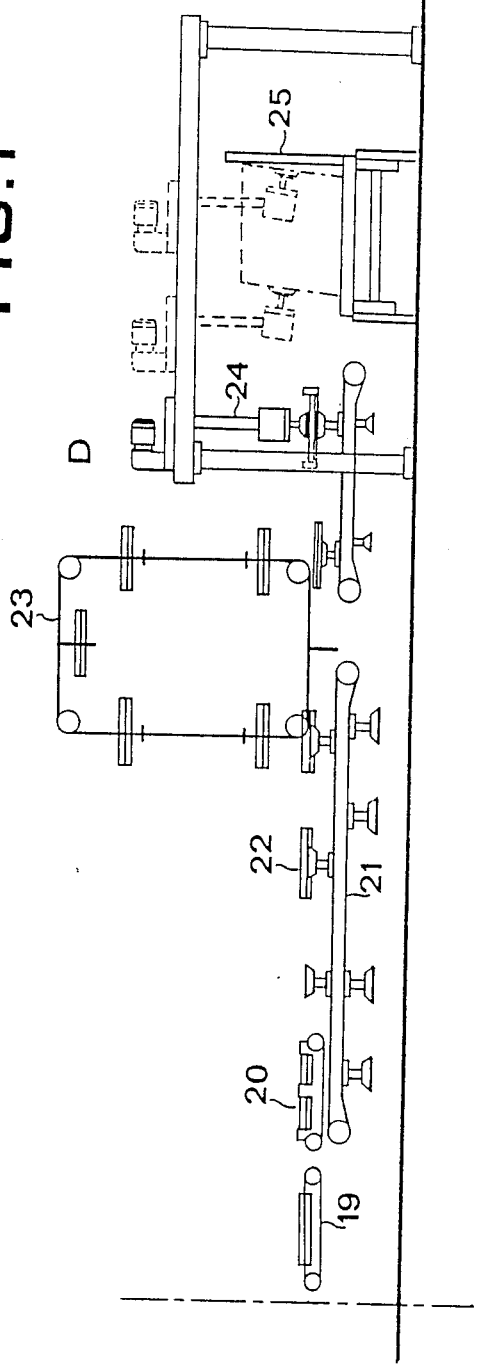

With reference to FIGS. 1 and 2 and according to the present invention, a sheet of glass V, for example a windscreen for motorvehicle, is taken from a container 1 and laid on a conveyor-belt 2 to be carried to a support 3 where it stops at the station A.

An overhead rotating carrier 4, provided with a suction arm, takes and carries the sheet to station B after rotating it horizontally through 90° so as to set it with the major axis parallel to the direction of motion.

In the position B the work piece is delivered to suction pads 5 of a carriage 6.

The carriage 6 is able to move on an horizontal plane 7 formed by rails, through wheels 8 controlled by an electric motor 9 (see FIG. 2).

On the displacement of the carriage 6 to the successive station C, the sheet of glass V is covered with a film of plastic material which is unwound from a roll 10. The film is preferably made of self-adhesive low density polyethylene about 50 micron thick, having a self-adhesive capability from 40 to 70 cN/cm and is commercially available. The film is kept taut by a tensioning roll 11 to avoid undesired creases and it is applied on the upper surface of the sheet of glass V by a roll 12. The roll 12 is made of a soft material so as to fit the shape and curvature of the glass surface. Roll 12 also has the function of driving the air out while the film is laid on the glass.

The roll 12 is supported by a vertically floating device 26 so as to ease fitting of said roll to the curvature of the glass surface.

When the carriage 6 arrives at the station C, the whole upper surface of the sheet of glass V is covered with the polyethylene film.

A clamp 13 engages the end flap of the film and a cutter 14 cuts the film off.

In position C an overhead conveyor 15 provided with a suction arm 16 engages and places the work piece, following a horizontal rotation through 90°, on a conveyor belt 17.

The glass V is carried to a station 18 where a trimming machine, not shown in the drawing, removes the polyethylene film from the rim of the sheet of glass to be capsulated.

A conveyor belt 19 carries the sheet of glass V to a successive station 20. In this station a machine (not shown in the drawing) sprays, a cleaning liquid serving the purpose of carrying out both an optical cleaning and a chemical cleaning. Said liquid in fact leaves on the glass a silane layer which promotes the bond between glass and adhesion promoter.

After the cleaning step, the sheet is carried by means of a suction conveyor 21 to a successive station 22 in which, by means of a pad or spray system, a monocomponent polyurethane adhesion promoter is applied serving the purpose of binding the glass to the polyurethane of the sealing strip.

Following this operation, the work pieces are transferred to a moving store 23 in which they rest for a time until the same work pieces can be handled, namely for the time required for evaporation of the solvents contained in the promoter.

Following said rest period, which generally does not exceed five minutes, the work pieces are again delivered to the suction conveyor 21 and carried to a station D, where they are rotated to a substantially vertical position by means of an overhead conveyor 24 and transferred to a store container 25.

The adhesion promoter will complete the cross-linking by effect of the atmospheric humidity, so as to efficiently exploit the bond action between glass and polyurèthane during the resting time in the store.

After completion of the cross-linking, the sheet of glass continues the work cycle which comprises the successive operation of capsulation and finishing.

In the finishing operation, after painting, when such operation is provided in this step, rather than in the capsulation step, the polyethylene film is easily removed by means of trimming and peeling.

Whereas the invention has been described in considerable detail in an embodiment thereof, it will be understood that modifications and variations can be envisaged within the scope of the invention.

We claim:

1. An automatic plant for the manufacture of a glass and sealing strip assembly including:
    a plurality of on-line apparatus units for carrying out a treating operation on rim areas of a sheet of glass so as to prepare it for a successive capsulating operation effected by a capsulating apparatus;
    an automatic laying machine positioned ahead of said online apparatus for laying on an entire surface of one face of the sheet of glass a protective layer of self-adhesive film of plastic material, said automatic layering machine comprising:
    a carriage (6) provided with wheels (8) and an electric motor (9) for controlling a displacement of said carriage on said wheels and having suction pads (5) for carrying a horizontally disposed sheet of glass (V),
    rails (7) extending on a horizontal plane for a horizontal displacement of said carriage on said rails,
    a structure in a fixed position above said rails and, supported on said structure, a roll (10) of self-adhesive plastic film, a tensioning roll (11) for keeping taut said film, a vertically floating device (26) on which a pressure roll (12) is mounted, a clamp (13) for engaging the end flap of the film, and a cutter (14) for cutting the film off, said horizontal displacement of said carriage bringing the sheet of glass in contact with the pressure roll so that the whole upper surface of the sheet of glass is covered with the adhesive film and said face remains covered and protected during a complete cycle of manufacture of the sheet glass and sealing strip assembly;
    a trimming machine for cutting and removing said layer from the rim area to be treated in said treating operation; and a peeling machine positioned after said capsulating apparatus for peeling off said layer from said face.

2. A plant according to claim 1, wherein the plastic material of said film is a self-adhesive low density polyethylene about 50 microns thick and having a self-adhesive capability from 40 to 70 cN/cm.

3. A plant according to claim 1, further comprising an overhead conveyor (15) provided with suction arms (16), for engaging from said carriage the sheet of glass covered with the adhesive film, and a conveyor belt (17) for receiving and displacing said sheet of glass from said overhead conveyor to said trimming machine.

* * * * *